United States Patent [19]

Hayner

[11] Patent Number: 6,027,557
[45] Date of Patent: Feb. 22, 2000

[54] OXIDIZED BLENDS OF ASPHALT AND PARAFFINIC BASE STOCK FLUXING COMPONENT HAVING IMPROVED LOW TEMPERATURE PROPERTIES

[75] Inventor: Roger E. Hayner, Russell, Ky.

[73] Assignee: Marathon Ashland Petroleum LLC

[21] Appl. No.: 09/109,127

[22] Filed: Jun. 30, 1998

Related U.S. Application Data

[60] Provisional application No. 60/052,936, Jul. 17, 1997.

[51] Int. Cl.⁷ .................................................. C09D 195/00
[52] U.S. Cl. ........................................... 106/279; 106/280
[58] Field of Search ...................................... 106/279, 280

[56] References Cited

U.S. PATENT DOCUMENTS

| | | |
|---|---|---|
| 2,870,080 | 1/1959 | Illman et al. . |
| 2,947,697 | 8/1960 | Vierk et al. . |
| 2,970,099 | 1/1961 | Illman . |
| 3,455,716 | 7/1969 | Loring et al. . |
| 3,663,281 | 5/1972 | Fauber ..................... 106/279 |
| 3,930,988 | 1/1976 | Johnson . |
| 3,940,281 | 2/1976 | Corbett . |
| 4,068,023 | 1/1978 | Nielsen et al. . |
| 4,078,117 | 3/1978 | Hutchison ................ 428/446 |
| 4,250,021 | 2/1981 | Salusinszky . |
| 4,381,992 | 5/1983 | Wood et al. . |
| 4,724,247 | 2/1988 | Burton et al. . |
| 5,098,556 | 3/1992 | Go et al. . |
| 5,221,703 | 6/1993 | Ostermeyer . |
| 5,331,028 | 7/1994 | Goodrich . |
| 5,397,459 | 3/1995 | Butler . |
| 5,437,717 | 8/1995 | Doyle et al. . |
| 5,447,628 | 9/1995 | Harrison et al. . |
| 5,476,542 | 12/1995 | Doyle et al. . |
| 5,496,400 | 3/1996 | Doyle et al. . |
| 5,580,376 | 12/1996 | Hayner ................................. 106/284.1 |
| 5,904,760 | 5/1999 | Hayner .................................... 106/279 |

FOREIGN PATENT DOCUMENTS

| | | |
|---|---|---|
| 0300284A | 1/1989 | European Pat. Off. . |
| 0380384A | 8/1990 | European Pat. Off. . |
| 2462459A | 2/1981 | France . |
| 8808866A | 11/1988 | WIPO . |

OTHER PUBLICATIONS

Caplus 1997:422870, Feng et al, "Development and application of paving asphalt . . . ", 1997.

An Overview of Lube Base Oil Processing Am. Chem. Soc., A. Sequoria R&D Texaco, Inc., (Aug. 23–28 1992,) pp. 1286–1293 U.S.A.

Used Oil Issues and Opportunities Am. Chem. Soc., L.M.Tientze, Texaco, Inc., (Aug. 23–28, 1992) pp. 1356–1366.

*Primary Examiner*—David Brunsman
*Attorney, Agent, or Firm*—Laurence P. Hobbes; Richard D. Stone

[57] ABSTRACT

Paraffinic fluxing components, e.g., paraffinic base stocks such as neutral oils or foots oil, can be added to asphalt composition and the resulting blend oxidized, e.g., by blowing, to improve low temperature properties at low addition rates (e.g., oil 1–5 wt. %). The resulting asphalt compositions exhibit important improvements in low temperature properties, resistance to thermal cracking and expanded useful temperature range.

20 Claims, 2 Drawing Sheets

OXIDIZED BLENDS OF ASPHALT AND PARAFFINIC BASE STOCK FLUXING COMPONENT HAVING IMPROVED LOW TEMPERATURE PROPERTIES

The application claims benefit of Provisional Application Ser. No. 60/052,936 filed Jul. 17, 1997.

BACKGROUND OF THE INVENTION

I. Field of the Invention

The invention relates to asphalt compositions and to a process for the improvement of their properties. The invention further relates to modified asphalt compositions useful in a variety of applications, particularly paving asphalts, and to construction methods utilizing such compositions.

II. Description of the Prior Art

Asphalt based materials are used extensively in a wide variety of applications. For example, asphaltic material is widely employed as a primary ingredient in coating compositions for structures, in sealants, and in waterproofing agents. Asphalt compositions have been used in paving mixtures with considerable advantage for many years. Many manufactured roofing materials, such as roofing shingles, impregnated felts, tars, mastics, and cements are also based on asphalt and compositions thereof.

U.S. Pat. No. 3,930,988 to Johnson (Phillips) teaches the process for treating used motor oils for reduction in ash content and metals. Further treatment by filtration through absorbents and then hydrotreating renders an oil product suitable for reuse in lubricating stocks. This patent provides a process for preparing lubricating materials which may be suitable for use in the present invention but does not teach the significance of using lubricating stocks with asphalt for improvement in low temperature performance properties.

U.S. Pat. No. 4,250,021 to Salusinszky teaches a process for removing metals and water from used lubricating oils rendering a product suitable for refinery feedstocks, fuel oil, or as blend stock for other hydrocarbon products or as rerefining feedstock. The claims of the reference deal strictly with the process of treating used oil materials and the ingredients used therein. No mention is made relative to the present invention which finds particular advantage in using a predominately paraffinic lube stock as a diluent/plasticizer for enhancing the low temperature properties of asphalt paving compositions.

U.S. Pat. No. 4,381,992 to Wood et al. (Phillips) teaches the process for purification of used oil by removal of the ash forming components and then subjecting the material to vacuum fractionation. The patent discusses that such fractionation renders a bottoms material too heavy for use as a lubricating oil, but useful as a gear oil or as an asphalt additive. No further mention of usefulness of the bottoms material is made. The claims of the invention deal only with the purification of used oil processes, a method for fractionating the same and in no form discuss the novel findings of our invention.

U.S. Pat. No. 5,098,556 to Go et al. (Lyondell) teaches the purification of white oils to remove color producing bodies detrimental to the acid treating process. The invention teaches the process for passing white oils through acid treated clay filtration to remove RCS (readily carbonizable substances) which render the oils undesirable for use. It does not teach the use of oils for improving low temperature performance of paving grade asphalts. The oils produced by this invention could be used in the present invention as alternatives to the specified hydrofinished neutral oils. However, their cost from the purification process would render them unattractive for use in asphalt.

U.S. Pat. No. 3,455,716 to Loring et al. (Sinclair) teaches the production of film forming coating compositions providing corrosion inhibiting properties. No mention is made of their usefulness in asphalt paving compositions for improvement of low temperature performance.

U.S. Pat. No. 2,970,099 to Illman (Shell) teaches the alkylation of asphaltenes for the improvement of weathering, viscosity-temperature slope, and sweating tendencies of asphalt compositions. The invention further comprises oxidation or air blowing of the asphalts in conjunction with alkylation. Further it teaches the use of 25 to 75 parts by weight of a mineral lubricating oil, well outside the range of usage within our invention, with the alkylated asphaltenes for use as roofing asphalts. The present invention does not require alkylation, however, the use of asphalts produced by the process of this reference may be used within our invention as the base asphalt. Illman does not teach the use of neutral oils for improvement of low temperature properties of paving asphalts or the blowing of mineral lubricating oil-containing asphalt compositions for such purpose.

U.S. Pat. No. 2,947,697 to Vierk et al. (Sinclair) teaches the production of protective wire rope lubricants comprising oil, polyethylene and oxidized asphalt. It does not teach the findings of the present invention for paving asphalts.

U.S. Pat. No. 2,870,080 to Illman et al. (Shell) teaches the production of an oil asphalt plastisol comprising a continuous oil phase in which a pulverized asphalt is suspended. Said composition of this invention is not homogeneous nor continuous until heated and fused at temperatures above the softening point of the asphalt component. Said asphalts in this invention will have 0–5 penetration and softening points of 82–116° C. (180–240° F.). The reference teaches the production of said asphalts by severely high steam distillation or solvent precipitation and said asphalts then being ground to a fine particle size and suspended in an oil carrier to form a plastisol with lower processing and handling viscosities until fused back into a continuous phase. The invention does not teach the novel findings of our present invention for producing low temperature grades of Superpave asphalts.

U.S. Pat. No. 5,397,459 to Butler (Exxon) teaches the low severity hydrotreating of used lube stocks which contain only low levels of additives such as industrial circulating oils. Such oils are required in low severity lubricating applications to produce lubricating base stock oils. This invention could produce oils suitable for use in our present invention. It does not teach the use of said oils with asphalts for low temperature performance improvements.

III. Problems Presented by Prior Art

Regardless of the particular manner of formation or application of the particular asphalt mixture, durability is an important matter in the case of most asphaltic materials. For instance, in the case of a paving asphalt composition, durability of the road surface is a primary concern. The degree and rate of hardening of the paving asphalt composition or cement during application and while in service (so-called "age hardening"), caused by an increase in viscosity of the asphalt mixture and gradual loss of flexibility, are factors affecting the durability of an applied surface. At least one worker in the art (i.e., Januschke, *Industrial Engineering Chemistry Product Research and Development*, Vol. 10, 1971, 209–213) has concluded that the reaction of the asphalt composition with atmospheric oxygen is the principal cause of asphalt hardening in pavement. Accordingly, the retardation of age hardening has been the object of extensive study.

Conventional refined asphalts have been found through the implementation of the Strategic Highway Research Program (SHRP) (now Superpave binder implementation) to be incapable of meeting requirements for resistance to low temperature thermal cracking in certain climatic areas or conditions. Modification using various types of modifiers such as plastomers, elastomers, chemical gellants, and chemical modifiers does not fully satisfy the improvement required in both high temperature rutting resistance and low temperature cracking resistance.

Conventional practice has been to add softer asphaltic compounds or aromatic oils or other additives to soften or plasticize the asphalt composition. In order to reach acceptable low temperature properties, excessive amounts of soft asphaltic materials or fluxes must be added. In addition, aromatic oils are normally required in such amounts that when used in combination with polymers (through the action of the increased aromaticity from the oil) cause the amount of polymer required to reach the desired level of rutting resistance to become excessive from a cost standpoint, eliminating the composition from use as a paving composition.

As a result of the 1987 Intermodal Surface Transportation Efficiency Act (ISTEA), a $150 million research study was commissioned in which $50 million was spent towards asphalt research for improving asphalt pavements. As a product of that research which was concluded in 1992, the Strategic Highway Research Program (SHRP) produced what is now known as the Superpave Performance Graded Binder Specification in which asphaltic binders are graded or characterized according to their relative performance in resistance to rutting, shoving or deformation at high temperatures, fatigue at intermediate temperatures, and thermal cracking resistance at low temperatures. Asphalts which normally would be graded either under the penetration or viscosity specifications will now be graded as PG or Performance Graded binders. As such, their designation will be representative of their resistance at both high and low temperature, indicating their useful temperature range as a PG AA–BB where AA=high temperature resistance in degrees Celsius and BB is low temperature cracking resistance in minus degrees Celsius, i.e., PG 64–22 would prevent rutting up to 64° C. (147° F.) and low temperature cracking to a minus 22° C. (−7.6° F.). Areas of high loading or slow or standing traffic as well as areas where temperature extremes can be experienced in excess of 86° C. (155° F.) between high and low temperature levels will require the use of modifiers to obtain the increased useful temperature range. As a result, it has been common to add or start with softer asphalts to reach low temperature properties while adding modifiers such as polymers to achieve high temperature rutting resistance. The use of aromatic oils has been included to also give low temperature properties. As such, extensive levels of polymer addition are required to regain high temperature properties, especially when using aromatic oils as their use tends to solvate the polymer to a higher degree and thus require a higher level of polymer to be used to obtain the desired property.

U.S. patent application Ser. No. 08/697,385, filed Aug. 23, 1996 (docket number 6505AUS), discloses the addition of mineral lubricating oil to an asphalt component, including oxidized asphalt component, for the purpose of improving the properties of the resulting blend. However, the application does not disclose oxidizing the blend of asphalt: component and mineral lubricating oil.

Notwithstanding the considerable previous efforts expended to provide asphalt compositions having improved low temperature cracking resistance, and to provide a method of improving asphalt durability, there has remained a continuing need, particularly with paving asphalts, for improved compositions and methods. The invention addresses this need.

SUMMARY OF THE INVENTION

I. General Statement of the Invention

The present invention relates to an asphalt composition comprising an oxidized mixture of at least about 80 wt. % asphalt and 0.1–20 wt. % of a paraffinic base stock fluxing component.

In another aspect, the present invention relates to a pavement composition comprising aggregate and from about 1.0 wt. % to about 10.0 wt. % of an oxidized mixture containing at least about 80) wt. % of asphalt and from about 1–20 wt. % of a paraffinic base stock fluxing component.

In still another aspect, the present invention relates to a process for improving the durability of an asphalt composition comprising i) blending with said asphalt composition, at a temperature sufficient to liquefy said paving asphalt composition, e.g., 38° to 204° C. (100° to 400° F.), an amount of paraffinic base stock fluxing component sufficient to reduce low temperature stiffness of the resulting blend after oxidizing, and ii) oxidizing the resulting blend to an extent sufficient to increase high temperature stiffness.

According to the invention, addition to asphalt compositions of paraffinic base stock fluxing component such as paraffinic mineral lubricant base oils (MLBO), preferably hydrofinished (HF) neutral oils, more preferably 100–325 neutral oil, followed by oxidizing the resulting asphalt/oil mixture gives a distinct improvement in low temperature properties at low addition rates, even over corresponding mixtures where the asphalt component is blown prior to addition of the fluxing component. Such improvement is surprising inasmuch as addition of the lighter paraffinic fluxing component, to the asphalt component prior to blowing would be expected to result in loss of the low temperature properties-enhancing additive during oxidizing.

Rerefined paraffinic base stock oils (boiling above about 175° C. (350° F.)) have the same properties as the 325 hydrofinished (HF) virgin base oil. Most rerefined oils are too dark in color to be used as lube oil base stocks but their use in asphalt would be ideal as color is not a problem and they are much cheaper in cost than virgin base oils, such as 325 HF. This also provides a new means to dispose of rerefined motor oil made by solvent extraction, distillation, etc., of used motor oil.

Accordingly, in one embodiment, the invention relates to a novel modified asphalt composition containing, an oxidized mixture of asphalt and a low temperature crack inhibiting level or stabilizing amount of, a paraffinic base stock fluxing component, e.g., paraffinic mineral oil lubricant base stock obtained from the conventional refining of crude petroleum, with or without modification additives such as polymers, chemical gellants, and antioxidants (added after oxidizing) and to compositions containing such modified asphalts. Generally, the modified asphalt compositions will comprise (a) about 0.1 to about 20 wt. % of a paraffinic base stock fluxing component, e.g, paraffinic mineral lubricating oil base stock, and (b) about 0 to about 20 wt. % of a polymer modifier, and (c) about 0 to about 5 wt. % of a chemical gellant and (d) at least about 80 wt. %, e.g., about 80 wt. % to about 99 wt. %, say, 90 wt. %, of an asphalt obtained from conventional vacuum distillation, solvent refining, or naturally occurring mineral sources, e.g., Trinidad Lake asphalt. Asphalt paving compositions of such exhibit a distinct improvement in low temperature properties, in their resistance to thermal cracking and fatigue as defined by the use of the new Superpave Performance Graded (PG) Asphalt Binder Specifications. AASHTO MP1. Paraffinic base stock fluxing component, e.g., paraffinic mineral oil lubricant base stocks, can be added at considerably lower levels before oxidizing the resulting asphalt/fluxing component mixture to obtain the desired low temperature properties, in comparison to oxidized asphalts to which fluxing component, e.g., MLBO, is added after oxidation. Adding paraffinic base stock fluxing component to the asphalt component prior to oxidizing also reduces the requirement level for polymers to provide high temperature performance capabilities.

The oxidized blends of asphalt and fluxing component of the present invention also exhibit improved low temperature performance properties without excessive sacrifice of high temperature PG grade performance, e.g., rutting resistance. High temperature performance can be determined by degree of oxidation as indicated by softening point measured by a ring and ball apparatus (ASTM D36).

Feeds

Asphalts

Asphalts for use in the present invention are not narrowly critical and can be any available asphalts. A typical paving asphalt mixture comprises a mixture of components, principal ingredients of the paving asphalt mixture being an asphalt composition or cement and aggregate or aggregate material. In such mixtures, the ratio of asphalt composition to aggregate material varies, for example, according to the aggregate material type and the nature of the asphalt composition. As used herein, the terms "asphalt composition," "asphalt cement," or "asphalt binder" are understood to refer to any of a variety of organic materials, solid or semi-solid at room temperature, which gradually liquify when heated, and in which the predominate constituents are naturally occurring bitumens, e.g., Trinidad Lake, or residues commonly obtained in petroleum, synthetic petroleum, or shale oil refining, or from coal tar or the like. For example, vacuum tower bottoms produced during the refining of conventional or synthetic petroleum oils is a common residue material useful as asphalt composition. A "paving asphalt composition," "paving asphalt cement," or "paving asphalt binder," accordingly is an asphalt composition or asphalt cement having characteristics which dispose the composition to use as a paving material, as contrasted, for example, with an asphalt composition suited for use as a roofing material. "Roofing asphalts," for example, usually have a higher softening point, and are thus more resistant lo flow from heat on roofs, the higher softening point generally being imparted by air blowing processes by which they are commonly produced. Paving asphalt mixtures may be formed and applied in a variety of ways, as well understood by those skilled in the art. For example, the paving asphalt composition and the aggregate can be mixed and applied at elevated temperatures at the fluid state of the paving asphalt composition to form the pavement or road surface.

Paraffinic Base Stock Fluxing Components

Suitable paraffinic base stock fluxing components are added to improve the flow properties of the asphalt composition and can improve the penetration for a desired softening point. Such paraffinic fluxing components contain at least 50 wt. % paraffins and less than 30 wt. % aromatics. Gas oils meeting these requirements (which can contain both isoparaffins and monoaromatics) include neutral oils, including hydrocracked or isodewaxed neutral oils. Other suitable paraffinic base stock fluxing components include paraffinic oils having at least 50 wt. % paraffins content (isoparaffins and normal paraffins) such as foots oil (which is highly paraffinic and obtained from deoiling slack wax), as well as slack wax itself Synthetic paraffinic base stocks such as poly(alphaolefins) (PAOs) are also suited for use as fluxing components. Paraffinic mineral lubricant base oils are especially useful in the present invention.

Foots Oil

The foots oil suited to use as a fluxing component in the present invention can be a by-product in the production of paraffin wax, e.g., the first foots oil fraction obtained from slack wax derived from a medium lubricating oil distilled from a mineral oil. The foots oil can be prepared by feeding a waxy petroleum crude oil to a crude still and taking off various cuts including a cut called medium lube distillate which is the preferred source of the foots oil used in this invention and which boils primarily in the range of 370° to 540° C. (700° to 1000° F.), preferably 430° to 480° C. (800° to 900° F.), and has an API specific gravity of 26, e.g., 25.5 to 26.5. This medium lube distillate may advantageously be further refined to improve color stability by solvent extraction using, e.g., phenol or furfural to remove aromatic type compounds. The lube distillate or the raffinate from solvent extraction is further refined by dewaxing, often at relatively low temperatures of, e.g., –23° C. (–10° F.), using various solvents or mixtures of solvents such as methyl ethyl ketone, benzene, acetone, and toluene to produce, after removal of the solvent, what is called a base lube oil stock and a slack wax. The slack wax is further refined to produce a deoiled slack wax and a foots oil, for instance, by further solvent extraction, using the same solvents but at higher temperatures, e.g., about 7° C. (45° F.), as in the dewaxing step above or by sweating.

The foots oil employed in the present invention is relatively low in aromatic compounds and is composed principally of n-paraffins, isoparaffins and monocyclic naphthenes. More specifically, the composition of the foots oil used can be about 40–50 wt. % n-paraffins, 5–15 wt. % isoparaffins, 35–45 wt. % monocyclic naphthenes and 1–5 wt. % aromatics.

Paraffinic Mineral Lubricating Oils

The manufacture of paraffinic mineral lubricant base oils useful as fluxing components herein consists of five basic steps: 1) distillation, 2) deasphalting to prepare the feedstocks, plus optionally 3) solvent or hydrogen refining to improve viscosity index (VI), 4) solvent or catalytic dewaxing to remove wax and improve the low temperature properties, and/or 5) clay or hydrogen finishing to improve the color, stability and quality of the base oil stocks. Many processes available to prepare mineral lubricant oils are known to those skilled in the art and may be employed in the present invention. In one embodiment, mineral lubricant oil substantially free of wax is preferred.

Rerefining of used paraffinic lubricant base stocks can and may include all or in part of the above processes utilized to prepare virgin lubricant base oils. The processes usually provide a blend of light overhead components, lubricant oils, and a residue bottoms material. Several processes commonly known to those skilled in the art may be utilized to prepare compositions useful in the present invention. See particularly those compositions described in the patents listed under prior art, above.

Oxidizing Conditions

The mixed blend of asphalt and paraffinic fluxing component, e.g., paraffinic MLBO, is subjected to oxidizing (conditions. Oxidizing can be carried out by exposing the blend to oxidizing agents such as oxygen, air, or oxidizing agents such as peroxides, etc. Preferably, such oxidizing is carried out by heating the mixed blend to temperatures ranging from 66° to 316° C. (150 to 600° F.), preferably 150 to 260° C. (300 to 500° F.), and forcing oxygen-containing gas, e.g., air through the blend. The oxidizing step can be conducted using air flow rates of 0.5 to 20 standard cubic feet per hour. Oxidizing can be carried out until a desired softening point of the blend is reached as measured by ring and ball apparatus (ASTM D36).

After subjecting the asphalt/fluxing component blend to oxidizing conditions, additional components may be added to the blend as discussed below.

Polymer Modifiers

The polymers used for modifying the oxidized blends of asphalt and fluxing component are well-known to those skilled in the art and comprise: Styrene Butadiene (SB), diblock polymers. Styrene-Butadiene-Styrene (SBS), triblock polymers which may be either linear or radial, styrene-isoprene-styrene (SIS), diblocked polymers, hydrotreated SBS, Styrene Ethylene Butadiene Styrene polymers (SEBS), Styrene Butadiene Rubber (SBR), polyacrylamide, e.g., those described in U.S. Pat. No. 4,393,155 to Garrett; Glycidyl-containing ethylene copolymers in U.S. Pat. No. 5,331,028; or Crumb Rubbers.

Gellants

Similarly, the gellants which can be added to the oxidized blends are not narrowly critical and can include: chemical gellants such as metallic soaps formed by the neutralization of fatty acids and/or rosin acids; organoclays, e.g., bentonites, kaolin clays, etc.; hydrogenated castor oils; oligomers; siloxanes; or others well-known to those skilled in the art or included in the patent or other literature.

Antioxidants

Though not narrowly critical, preferred antioxidants are an oxidation inhibiting or stabilizing amount of a composition selected from metal hydrocarbyl dithiophosphates, and mixtures thereof, and a composition selected from antioxidant butylated phenols, and mixtures thereof, in a specified ratio to each other, as described more fully hereinafter. Preferably, the components are added to the oxidized blend of asphalt and fluxing component so that the resulting product comprises from about 0.0 wt. % to about 5.0 wt. % of a composition selected from metal hydrocarbyldithiophosphates, and mixtures thereof, and from about 0.0 wt. % to about 5.0 wt. % of a composition selected from antioxidant butylated phenols, and mixtures thereof, in a specified ratio to each other, as described more fully hereinafter. Most preferably, metal hydrocarbyl dithiophosphate component employed is a mixture of such dithiophosphates, and the metal hydrocarbyl dithiophosphate component is supplied in an amount of from about 0.0 wt. % to about 2.0 wt. %. The antioxidant butylated phenol is preferably supplied in a range of from about 0.0 wt. % to about 2.0 wt. %.

Hydrocarbon Solvents

The hydrocarbon solvents can be any which are capable of reducing the viscosity of the asphalt. Preferred solvents include: mineral spirits; naphthas; kerosenes; and fuel oils.

Emulsifiers

The emulsifiers include anionic or cationic or nonionic emulsifiers. Those particularly preferred are those described in U.S. Pat. No. 4,393,155 to Garrett, the contents of which are incorporated herein by reference.

Temperature

While not narrowly critical, sufficient heat is necessary to maintain the oxidized asphalt composition in the molten state, sufficiently fluid to allow proper mixing and pumpability.

Pressure

Greater than atmospheric pressure is optional; atmospheric pressure is preferred.

Batch or Continuous

While the invention will most commonly be practiced as a batch process, continuous processing with continuous mixing of the ingredients, e.g., fed directly into transport trucks, can be utilized.

Compositions

In one embodiment, the invention relates to a novel modified asphalt composition containing (a) an oxidized blend of asphalt and a low temperature cracking and intermediate temperature fatigue improvement additive of a paraffinic base stock fluxing component, e.g., those selected from virgin or rerefined mineral lubricating oil base stocks, (b) an elastomeric and/or plastomeric polymer modifier composition and combinations thereof, and (c) a chemical gellant, (b) and (c) being optionally present in the asphalt composition. Generally, the modified asphalt compositions of the invention comprise (a) an oxidized blend of at least about 80 wt. % asphalt and from about 0.1 to about 20 wt. % of a paraffinic base stock fluxing component, e.g., a composition selected from virgin or rerefined mineral lubricating oil base stocks and mixtures thereof, (b) from about 0.0 to about 25 wt. % of a composition selected from elastomeric and/or plastomeric polymer modifiers and combinations thereof, and (c) from about 0.0 to about 10 wt. % of a chemical gellant selected from metallic soaps formed from the neutralization of fatty and rosin acids, organoclays, bentonite clays, hydrogenated castor oils, oligomers, siloxanes, or others well known to those experienced in the art. Unless indicated otherwise, all compositions percentages given herein are by weight, based upon the total weight of the composition. As indicated, the virgin or rerefined mineral lubricating oil base stock may be present as a mixture of such compositions where more than one viscosity, pour point, or viscosity index (VI) are present. The fluxing components, e.g., virgin or rerefined mineral lubricating oil base stocks are preferably present in an amount from about 0.5 wt. % to about 15 wt. %. The elastomeric and/or plastomeric polymer modifiers and combinations thereof are preferably present in an amount from about 0.0 to about 20 wt. %. The chemical gellant is more preferably present in an amount from about 0.0 to about 7 wt. %. All percents herein are by weight of total (composition.

Processes

The invention, in a second embodiment, relates to a process or method of improving the low temperature cracking and intermediate temperature fatigue resistance of an asphalt composition comprising i) blending with said asphalt composition, at a temperature sufficient to liquefy said asphalt composition, e.g., 38° to 204° C. (100° to 400° F.), a paraffinic base stock fluxing component, e.g., a virgin or rerefined paraffinic mineral lubricating oil base stock or mixtures thereof, in an amount sufficient to reduce low temperature stiffness (as measured by reduced low temperature ratings for Superpave Performance Graded (PG) Asphalt Binder Specifications, AASHTO MP1) of the resulting blend after oxidizing; ii) oxidizing the resulting blend under conditions sufficient to improve low temperature cracking resistance; and iii) optionally adding to said oxidized blend an elastomeric and/or plastomeric polymer modifier or combinations thereof, and/or chemical gellant(s) in a specified ratio to each other, as described more fully hereinafter. Preferably, the components are added so that the asphalt/fluxing component blend comprises from about 0.1 to about 20 wt. %, preferably from about 0.5 to about 15 wt. %, of a paraffinic fluxing component, e.g., a composition selected from virgin or rerefined paraffinic mineral lubricating oil base stocks or mixtures thereof, prior to oxidizing. Additives are added in amounts such that the resulting asphalt composition contains from about 0.0 to about 25 wt. %, preferably from about 0.0 to about 20 wt. %, of an elastomeric and/or plastomeric polymer modifier and mixtures thereof, and from about 0.0 to about 10 wt. %, preferably from about 0.0 to about 7 wt. %, of a chemical gellant. All additive percentages are percent by weight of the total composition.

Asphalt Emulsions

In another embodiment, the invention relates to a novel low temperature cracking and intermediate temperature fatigue resistant asphalt emulsion composition comprising i) an oxidized blend of at least about 80 wt. % asphalt and a paraffinic fluxing component, e.g., virgin or rerefined paraffinic mineral lubricating oil base stock or mixtures thereof, in an amount from about 0.1 to about 20 wt. %, ii) an elastomeric and/or plastomeric polymer modifier in an amount from about 0.0 to about 25 wt. %, iii) 0.1 to about 10 wt. % of an emulsifier consisting of anionic, cationic or non-ionic compositions commonly known to those skilled in the art, and iv) water in amounts from about 1.0 to about 90 wt. %. Preferred combinations of the emulsion ingredients can be chosen to produce rapid set (RS), medium set (MS) or slow set (SS) as well as high float (HF) versions according to particular agency specifications under which they are to be supplied.

Asphalt Pavement

In still another embodiment, the invention relates to a novel low temperature cracking and intermediate temperature fatigue resistant asphalt pavement or composition comprising an aggregate or aggregate material and from about 1.0 wt. % to about 10.0 wt. % of the novel modified asphalt composition described herein.

II. Utility of the Invention

More particularly the invention relates to novel modified asphalt compositions characterized by improved low temperature performance properties and resistance to thermal cracking, expanded useful temperature interval range, and to a process for producing such novel asphalt compositions.

DETAILED DESCRIPTION OF THE INVENTION

Any suitable asphalt composition or cement may be employed for producing the modified asphalt compositions of the invention. For example, industrial asphalts used for coatings, sealants, roofing materials, adhesives, and other applications may be used. Paving grade asphalt compositions, however, are employed in the preferred embodiment of the invention. Asphalt compositions may be derived, as indicated, from any well known bituminous or asphaltic substance obtained from natural sources or derived from a number of sources such as petroleum, shale oil, coal tar, and the like, as well as mixtures of two or more of such materials. Typical of such asphalts are the straight run asphalts derived from the atmospheric, steam and/or vacuum distillation of crude oils, or those asphalts derived from solvent precipitation treatments of raw lubricating oils and their fractions. Also included are the thermal or "cracked" asphalts which are separated as cracker bottom residues from refinery cracking operations and the asphalts produced as byproducts in hydrorefining operations. A preferred asphalt is the vacuum tower bottoms that is produced during the refining of synthetic or petroleum crude oils. As indicated, for paving applications, any suitable paving grade asphalt may be employed for the compositions of the invention. Such paving grade asphalt compositions are often referred to as viscosity, penetration graded, or performance graded (PG) asphalts having penetrations up to 400 as measured by ASTM method D5. Preferred asphalts are the performance graded asphalts such as PG 46-40, PG 46-34, PG 46-28, PG 52-40, PG 52-34, PG 52-28, PG 52-22, PG 58-40, PG 58-34, PG 58-28, PG 58-22, PG 64-40, PG 64-34, PG 64-28, PG 64-22, PG 70-40, PG 70-34, PG 70-28, PG 70-22, PG 76-40, PG 76-34, PG 76-28, PG 76-22, PG 82-34, PG 82-28, or PG 82-22. The PG in the title referring to Performance Graded, the first numeric designation referring to the binder's high temperature rutting or deformation resistance temperature range limit, and the last numeric designation referring to the binder's low temperature thermal cracking resistance temperature limit. Complete specification requirements are outlined in specifications under AASHTO MP- 1-93 Performance Graded Asphalt Binder Specification. AASHTO is the designation for the American Association of State and Highway Transportation Officials. The virgin or rerefined mineral lubricating oil base stocks employed in the invention are known to be selected from solvent refined neutral oils, foots oils, and naphthene pale oils (reference paper published in ACS Preprints volume 37, no. 4, August 1992 "An Overview of Lube Base Oil Processing," Avilino Sequeira, Texaco Inc. R&D). Solvent neutral oils (SNO's) are vacuum distilled paraffinic base oils that are refined for VI appreciation and aromatics removal. They are also dewaxed for pour point reduction and hydrogenated for stability. These base oils are characterized by high API gravity, flash point, aniline point, and VI. Naphthenic pale oils are vacuum distilled naphthenic base oils that are refined for aromatics removal and dewaxing is generally not required. Rerefined oils may be obtained from any of numerous processes which ale not narrowly critical for this applications. Bottoms from the rerefining process are generally not desirable for use in the invention due to their potential to contain hazardous levels of lead, arsenic, chromium, or cadmium, halogens, and polynuclear aromatic compounds. Further, lubricant additives such as dispersants, detergents and the like are retained in the bottoms material and can interfere with the efficiency of polymers, gellants, or emulsifiers. Synthetic polyalphaolefins (PAOs) are also suited to use in the present invention.

Elastomeric or Plastomeric polymer modifiers or mixtures thereof may be employed. As used herein, the term "elastomeric" refers to a composition or compound which is a member of the class of polymers known as block copolymers. They can be chosen from either diblock, i.e., Styrene Butadiene(SB), or triblock, i.e., Styrene Butadiene Styrene (SBS), Styrene Isoprene Styrene(SIS), Styrene Polyethylene Styrene(SEBS), or random block copolymers such as SBR latexes or natural rubber latexes(neoprene). Recycled Crumb Rubber elastomers may also be utilized. As used herein, the term "Plastomeric" refers to those polymers normally chosen from either polymers or copolymers which tend to stiffen a mixture but do not offer an elastic or elastomeric benefit. Such modifiers are normally chosen from polyethylene, oxidized polyethylenes, ethylene vinyl acetate, ethylene terpolymers, and others commonly available under the trade names Elvax, Elvaloy, Polybuilt, Vestoplast, as well as many others commonly known to those skilled in the art. The composition of the invention may contain either or both of the polymer modifiers to tailor high temperature rutting and fatigue resistance to a specific grade requirement.

Chemical gellants may be used if desired and are normally chosen from compositions comprising soaps of resin and fatty acid mixtures as outlined in U.S. Pat. No. 4,874,432 to Kriech et al., assigned to Asphalt Materials or as outlined in recent patents (U.S. Pat. No. 5,437,717; U.S. Pat. No. 5,476,542; and U.S. Pat. No. 5,496,400) to Doyle et al., which concern improvements to that of Kriech, and U.S. Pat. No. 5,221,703 to Ostermeyer et al. Further, common gallants such as stearates and metallic soaps commonly used in the grease-making processes as well as the use of bentonite clays or amine treated or organoclays may be used for the present invention to control high temperature grading performance.

Table A summarizes preferred, more preferred and most preferred parameters of the process of the invention. In all embodiments, the asphalt and oil are blended together, the resulting blend is oxidized, and the additives thereafter introduced.

TABLE A

PROCESS

| Parameter | Units | Preferred | More Preferred | Most Preferred |
|---|---|---|---|---|
| Ingredients | | Asphalt Oil Polymer Others | Asphalt Oil Polymer | Asphalt Oil |
| Mixing Order | | Asphalt Oil Polymer | Asphalt Oil Polymer Emulsifier, etc. Water | Asphalt Oil Polymer Gel, antioxid. Water |
| Mixing Shear | — | Medium | Med.-high | High with polymer add. |
| Temp | °F. | 100–400 | 150–390 | 250–375 |
| | °C. | 35–205 | 65–200 | 120–195 |
| Pressure | | Optional | Optional | Optional |
| Batch, Continuous | — | Batch, Continuous | Batch, Continuous | Batch, Continuous |

Table B summarizes preferred, more preferred and most preferred parameters of the composition of the invention.

TABLE B

COMPOSITIONS

| Elements | Units | Preferred | More Preferred | Most Preferred |
|---|---|---|---|---|
| Asphalts | wt. % | 50–99 | 70–99 | 80–99 |
| | Type | refined, natural & reconstituted oxidized | refined or reconstituted | vac. distill. |
| Min. Oil Lub. Base Stock | wt. % | 0.1–20 | 0.5–15 | 1–10 |
| | Type | waste oils, foots oils, solv. neutrals, synthetics, rerefined, or arom. extracts | solv. neutral or rerefined, arom. extracts, synthetic | solv. neutral or rerefined lube base stocks |
| Polymers | wt. % | 0–20 | 0.5–15 | 1–6 |
| | Type | PE, EVA, Oxidized PF, SB, SBS, SIS, SBR, SEBS, acrylamides | SB, SBS, SBR SIS | SB, SBS |
| Gellants | wt. % | 0–10 | 0.5–8 | 0.5–6 |
| | Type | stearates, tall oil soaps, clays, ligomers | stearates, tall oil soaps, clays, organo | metal stearates soap of tall oil fatty acid |
| Antioxidants | wt. % | 0–10 | 0.0–5 | 0.0–3 |
| | Type | butylated phenols, amines, nickelates, etc. | butylated phenols | butylated phenols/metal hydrocarbyl-dithiophosphate |
| Solvent | wt. % | 0–90 | 0.5–50 | 1–20 |
| | Type | organic solvent | nonchlorinated organic solv. | diesel, #2 fuel oil, kerosene, naphthas |
| Emulsifiers | wt. % | 0–20 | 0.1–10 | 0.2–5 |
| | Type | clay, anionic, cationic, nonionic | anionic, cationic, nonionic | anionic, cationic |
| Water | wt. % | 0–80 | 0.5–50 | 1–30 |

Table C summarizes preferred, more preferred and most preferred parameters of the apparatus of the invention. Oxidizing is carried out in a closed reactor or properly equipped tank.

TABLE C

APPARATUS

| Parameter | Units | Preferred | More Preferred | Most Preferred |
|---|---|---|---|---|
| Vessel | | Closed Reactor | Closed Reactor followed by Tank | Closed Reactor followed by Tank with in-line high shear mixer |
| Mixer | | Stirrer | High shear mixer | In-line static mixer or in-line blender |
| Circulation | | Mixer only | | Circulating pump with tank mixer |

BRIEF DESCRIPTION OF THE DRAWINGS

FIG. 1 shows an apparatus for blending and oxidizing the resulting blend used to prepare the product of the present invention. A charge of asphalt and fluxing component is introduced through line 1 (controlled by valve 1a) to a simple kettle 2 equipped with a conventional high speed mixer 3 in which the asphalt/paraffinic base stock fluxing component (MLBO) ingredients are blended. The kettle may be mounted on load cells 4 and 5 which measure the amount of ingredients added to the kettle. The blended mixture is removed through line 6 by pump 7 and recirculated to the kettle through line 8 (controlled by valve 8a) or introduced through line 9 (controlled by valve 9a) to a conventional tank oxidizer 10 equipped with a conventional high speed mixer 11 where the blend is contacted with compressed air from line 12 to manifold 13 under oxidizing conditions to form the asphalt composition of the invention or an intermediate for further modification with polymers, additives, or processes commonly known to those skilled in the art. Gases evolved during oxidation are vented through line 14. The tank oxidizer may be mounted on load cells 15 and 16 which measure the amount of blended asphalt introduced to the tank oxidizer 10. The oxidized blend product is removed via line 17 to storage or for further modification.

FIG. 2 shows a preferred mixing setup for the oxidized blend product from line 17 of FIG. 1. The oxidized blend product is conveyed by pump 20 through line 21 which is controlled bit valve 21a and valve 22a (which can direct the product to storage through line 22) to tank 23 which is equipped with a high speed mixer 24. Additional polymers or additives such as gellants, diluents, etc., are added through line 25 which can be equipped with an auger for polymer loading. The tank 23 may be mounted on load cells 26 and 27 which measure the amount of ingredients added. The resulting mixture is removed through line 28 (controlled by valve 28a) and can be passed to storage through line 29 (controlled by valve 29a) or driven by pump 30 to high shear mill 31 as needed for proper dispersion of polymers or additives as material is pumped to tank 32 which is equipped with a high speed mixer 33. The tank 32 may be mounted on load cells 34 and 35. The resulting material is then passed by line 36 to storage or recirculation to high shear mill 31 until the desired dispersion is obtained. The resulting material is pumped to storage for use as asphalt binders. Compositions may be emulsified further for preparation of asphalt emulsion compositions if so desired.

DESCRIPTION OF THE PREFERRED EMBODIMENTS

EXAMPLE 1

Figure 1:
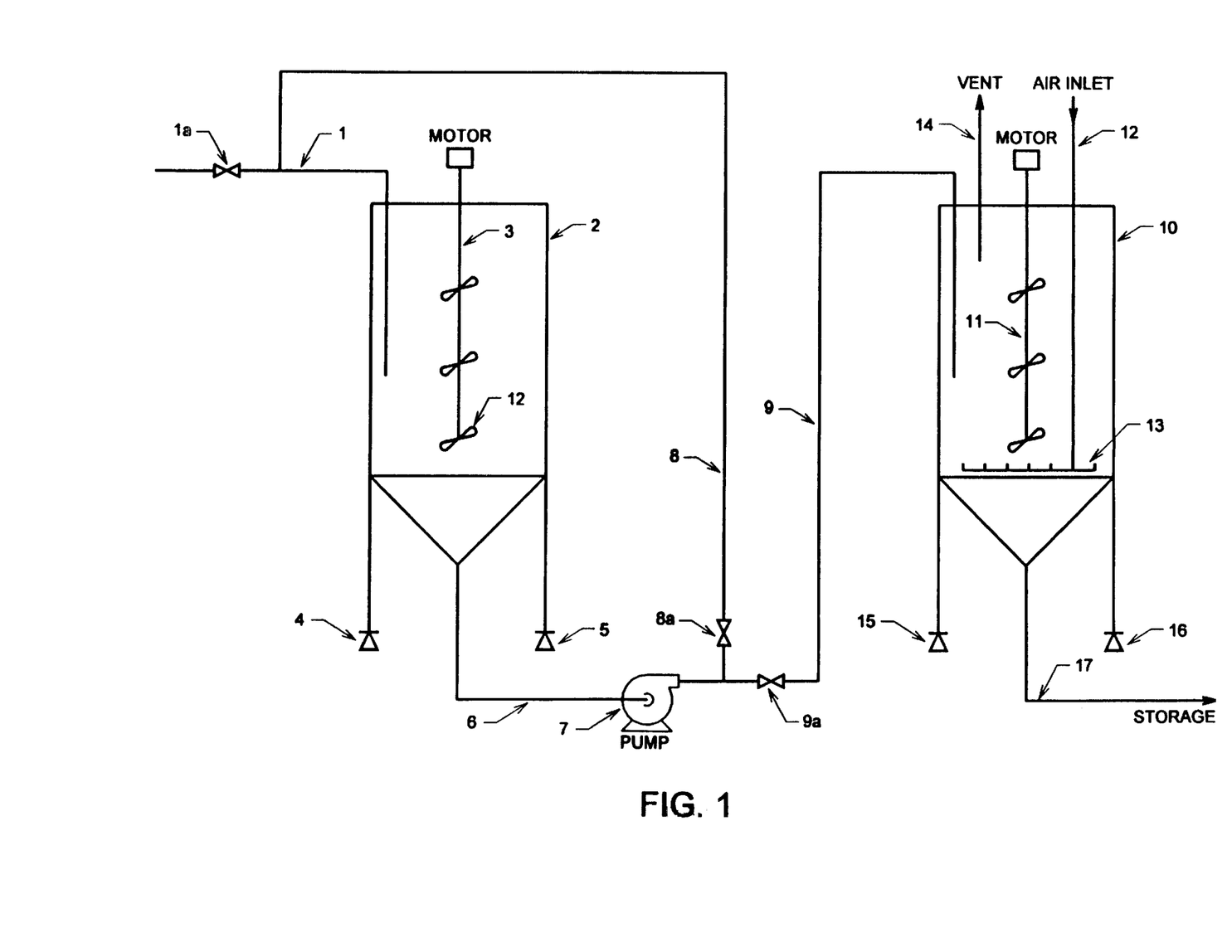
Figure 2:
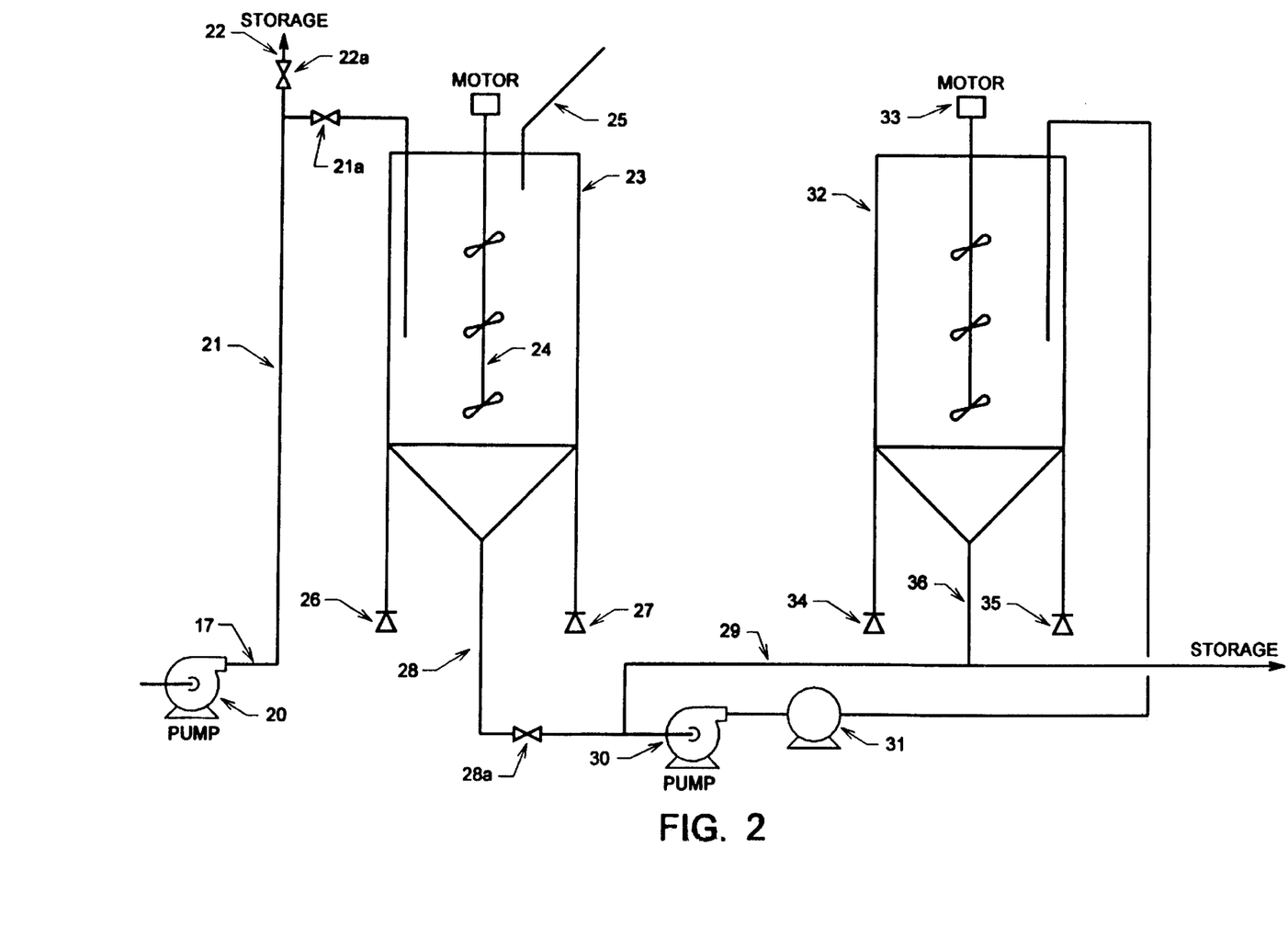

Referring to FIGS. 1 and 2, to a conventional mixing kettle 2 equipped with agitators and circulation to a high shear mill 31 are added in order: 95 parts by weight of AC5 asphalt cement manufactured to comply with AASHTO Table 2 specifications for viscosity graded asphalt cements (substitutable by a PG52-28 or PG52-34 performance graded binder produced according to the specifications outlined in AASHTO MP1) and 5 parts by weight of a mineral lubricating base oil commonly used for lubricants, manufactured by Ashland Petroleum Company and marketed under the 325 HF Neutral brand name. Agitation is then started either using circulation pumps or with the use of internal agitators mixing the composition until homogeneous. The resulting mixture is then oxidized in a separate vessel under atmospheric conditions at temperatures of 250° C. (482° F.) until a desired softening point of 45.6° C. (114° F.) as measured with a ring and ball apparatus (ASTM D36) is reached, Oxidation is performed by blowing air through the material at a controlled rate until the desired softening point is reached. The material is then allowed to cool to 175° C. (347° F.) and is pumped to storage. Performance Grading (PG) is then conducted according to AASHTO specifications. This mixture was measured to be a PG 58-28 with actual temperature measurements of PG 62.4-33.5.

EXAMPLE 2 (COMPARATIVE)

The AC5 asphalt cement of Example 1 without the mineral lubricating base oil additive is charged to the oxidizing vessel and oxidized to the 45.6° C. (114° F.) softening point using the same conditions as Example 1. The resulting material meets the PG58-28 specification but the actual temperatures are measured to be PG62.5-29.1. While having nearly the same high temperature grading as Example 1, Example 2 has a low temperature grading 4.4° C. worse, indicating considerably higher potential for thermal cracking.

EXAMPLE 3

Example 1 was repeated except that the oxidation was continued until a desired softening point of 53.9° C. (129° F.) was reached using the ring and ball apparatus. Resulting compositions graded according to AASHTO MP1 were found to meet PG70-28 with actual temperatures measuring PG71.5-31.4.

EXAMPLE 4 (COMPARATIVE)

The AC5 component without the mineral lubricating base oil was oxidized to a softening point of 51.7° C. (125° F.) using the same conditions and equipment as Example 3. The resulting composition was found to meet a PG70-22 with actual temperature grading of PG 70.5-26.5.

EXAMPLE 5 (COMPARATIVE)

As a comparative to Example 1, an AC5 is oxidized under the conditions given for Example 1 without the addition of the mineral lubricating base oil to a softening point of 53.4° C. (128° F.). The resulting material was measured to be a PG70-22 with an actual grading of PG71.5-24.0.

EXAMPLE 6 (COMPARATIVE)

As a comparison to Example 1 showing the advantage of the present invention's oxidized blend as opposed to a blend of oxidized asphalt component and neutral oil (added after oxidation), the composition produced in Example 5 was diluted with 5% neutral oil to prepare a material having a softening point of 45.6° C. (114° F.). The resulting blend was found to have a PG grading of PG 58-22 with actual temperature grading of PG62.0-27.4.

EXAMPLE 7 (COMPARATIVE)

As a comparison to Example 1 showing the importance of order of addition, an AC5 asphalt cement was oxidized without the addition of the mineral lubricating base oil to a softening point of 50° C. (122° F.) and a PG grading of PG64-22 and an actual temperature grading of PG67.2-27.1. To this material was added 3 wt. % neutral oil to reach the 45.6° C. (114° F.) softening point. The resulting material meets a PG58-28 with an actual grading of PG63.5-30.2 (compared to PG58-28 with actual temperature grading of PG62.4-33.5 for Example 1).

EXAMPLES 8 TO 22

Examples 8 to 22 reflect variations of the invention utilizing rerefined MLBOs as well as comparative examples of other commonly used fluxing agents as listed in Table D below.

TABLE D

| Example # Reference: Invention/Comparative | 1 LB20290 INVEN-TION | 2 LB20277 COMP. | 3 LB20282 INVEN-TION | 4 LB20278 COMP. | 5 CN20028 COMP. | 6 LB20228T COMP. | 7 100073001-08269 COMP. | 8 LB20296 COMP. | 9 LB20291 INVEN-TION | 10 CB20282 COMP. | 11 LB20295 COMP. |
|---|---|---|---|---|---|---|---|---|---|---|---|
| AC5% | 95.0 | 100.0 | 95.0 | 100.0 | 100.0 | 95.0 | 95.0 | 80.0 | | | 95.0 |
| AC20% | | | | | | | | | | 100.0 | |
| AC20 SDA Blend % | | | | | | | | | 95.0 | | |
| 100 HF NEUTRAL % | 5.0 | | | | | | | | 5.0 | | |
| 325 HF NEUTRAL % | | | 5.0 | | | 5.0 | | | | | |
| FOOTS OIL % | | | | | | | 3.0 | | | | |
| 325 AROMATIC EXTRACT % | | | | | | | | 20.0 | | | |
| CYLINDER STOCK % | | | | | | | | | | | 5.0 |
| 61206 Rerefined Lube Stock % | | | | | | | | | | | |
| Vacuum Gas Oil % | | | | | | | | | | | |
| Heavy Gas Oil % | | | | | | | | | | | |
| Oxidized - yes/no | YES | YES | YES | YES | YES | YES*² | YES*¹ | YES | YES | NO | YES |
| Ring & Ball Softening Point, °F. | 114 | 114 | 129 | 125 | 128 | 114 | 114 | 119 | 120 | 119 | 119 |
| PG Grade | 68-28 | 58-28 | 70-28 | 70-22 | 70-22 | 58-28 | 58-22 | 68-28 | 64-28 | 64-22 | 64-28 |
| Actual PG Grade | 62.4-33.5 | 62.5-29.1 | 71.5-31.4 | 70.5-26.5 | 71.5-24.0 | 63.5-30.2 | 62.0-27.4 | 63.3-29.8 | 66.4-32.6 | 64.5-25.0 | 65.0-29.3 |

| Example # Reference: Invention/Comparative | 12 LB20283 COMP. | 13 LB20300 INVEN-TION | 14 LB20301 INVEN-TION | 15 LB20302 INVEN-TION | 16 100074001-01069 INVENTION | 17 100074002-01069 INVENTION | 18 100074002-01079 COMPARATIVE | 19 100074001-01089 COMPARATIVE | 20 100074002-01109 INVENTION | 21 100074001-011087 INVENTION |
|---|---|---|---|---|---|---|---|---|---|---|
| AC5% | | 95.0 | 95.0 | 95.0 | 95.0 | 95.0 | 95.0 | 95.0 | 95.0 | 95.0 |
| AC20% | 100.0 | | | | | | | | | |
| AC20 SDA Blend % | | | | | | | | | | |
| 100 HF NEUTRAL % | | | | | | 5.0 | | | | 5.0 |
| 325 HF NEUTRAL % | | | | | 5.0 | | | | | |
| FOOTS OIL % | | | | | | | | | | |
| 325 AROMATIC EXTRACT % | | | | | | | | 5.0 | | |
| CYLINDER STOCK % | | | | 5.0 | | | | | | |
| 61206 Rerefined Lube Stock % | | 5.0 | 5.0 | | | | | | | |
| Vacuum Gas Oil % | | | | | | | 5.0 | | | |
| Heavy Gas Oil % | | | | | | | | | 5.0 | |
| Oxidized - yes/no | YES | YES | YES | YES | YES | YES | YES | YES | YES | YES |
| Ring & Ball Softening Point, °F. | 123 | 115 | 119 | 127 | 115 | 123 | 123 | 123 | 124 | 114 |
| PG Grade | 64-22 | 58-28 | 64-28 | 70-22 | 58-22 | 64-22 | 64-22 | 64-28 | 64-28 | 58-28 |
| Actual PG Grade | 67.9-23.8 | 63.1-32.7 | 66.8-30.1 | 71.9-27.2 | 63.1-28.5 | 67.4-26.5 | 69.5-27.2 | 69.2-29.4 | 68.3-29.2 | 63.6-31.5 |

*¹3% OIL ADDED AFTER AC5 OXIDIZED TO A PG67.2-27.1
*²5% OIL ADDED AFTER AC5 OXIDIZED TO A PG71.5-24.0 (128F S.P.)

MODIFICATIONS

Specific compositions, methods, or embodiments discussed are intended to be only illustrative of the invention disclosed by this specification. Variation on these compositions methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference.

What is claimed is:

1. A paving asphalt composition comprising an oxidized mixture of at least about 80 wt. % asphalt and 0.1–20 wt. % paraffinic base stock fluxing component, said fluxing component containing greater than 50 wt % paraffins and less than 30 wt. % aromatics.

2. The asphalt composition of claim 1 wherein said paraffinic base stock fluxing component is selected from the group consisting of mineral lubricating oil base stock, foots oil, slack wax, and poly(alpha-olefins).

3. The composition of claim 1 wherein said mixture is oxidized by air blowing at temperatures ranging from about 93° to 316° C.

4. An paving asphalt composition comprising an oxidized mixture of at least about 80 wt. % asphalt and 0.1–20 wt. % mineral lubricating oil base stock.

5. The composition of claim 4 comprising about 0.5–15 wt. % mineral lubricating oil base stock.

6. The composition of claim 4 wherein the mineral lubricating oil base stock comprises an element selected from the group consisting of waste oils, solvent refined neutral oils, and rerefined mineral lubricating oil base stocks.

7. The composition of claim 4 wherein the mineral lubricating oil base stock comprises 325 Neutral Oil.

8. The composition of claim 4 wherein the mineral lubricating oil base stock is substantially free of wax.

9. The composition of claim 4 further comprising an added element selected from the group consisting of polymer, gellant, and antioxidant.

10. The composition of claim 9 wherein said polymer comprises an element selected from the group consisting of Styrene Butadiene (SB), diblock polymers, Styrene-Butadiene-Styrene (SBS), triblock polymers which may be either linear or radial, styrene-isoprene-styrene (SIS), diblocked polymers, hydrotreated SBS, Styrene Ethylene Butadiene Styrene polymers (SEBS), Styrene Butadiene Rubber (SBR), polyacrylamide, crumb rubber, and glycidyl-containing ethylene terpolymer; said gellant comprises an element selected from the group consisting of metallic soaps formed by the neutralization of fatty acids and/or rosin acids, organoclays, hydrogenated castor oils, oligomers, and siloxanes; said antioxidant comprises an element selected from the group consisting of butylated phenol and metal hydrocarbyl dithiophosphate.

11. The composition of claim 4 wherein the mineral lubricating oil base stock comprises solvent refined paraffinic neutral oil.

12. The composition of claim 4, additionally comprising an element selected from the group consisting of mineral spirits, naphtha, kerosene, and fuel oil.

13. The composition of claim 4, additionally comprising anionic, cationic or nonanionic emulsifiers.

14. A pavement composition comprising aggregate and from about 1–10 wt. % of an oxidized mixture containing at least about 80 wt. % of asphalt and from about 1–10 wt. % of paraffinic base stock fluxing component.

15. The composition of claim 14 wherein said paraffinic base stock fluxing component is selected from the group consisting of mineral lubricating oil base stock, foots oil, slack wax, and poly(alpha-olefins).

16. A pavement composition comprising aggregate and from about 1–10 wt. % of an oxidized mixture containing at least about 80 wt. % of asphalt and from about 1–10 wt. % of mineral lubricating oil base stock.

17. A process for improving the durability of a paving asphalt composition comprising i) blending with said asphalt composition at a temperature sufficient to liquefy said paving asphalt composition a paraffinic base stock fluxing component containing greater than 50 wt. % paraffins and less than 30 wt. % aromatics in amounts sufficient to reduce low temperature stiffness of the resulting blend after oxidizing, ii) oxidizing the resulting blend to an extent sufficient to reduce low temperature stiffness.

18. The process of claim 17 wherein said blending is carried out at a temperature of substantially about 35–205° C., said paraffinic base stock fluxing component is a mineral lubricating oil base stock and is added in amounts ranging from about 0.1–20 wt. % of the resulting blend and said oxidizing is carried out at at least about atmospheric pressure and temperatures ranging from 35–315° C.

19. The process of claim 17 wherein said paraffinic base stock fluxing component is added in amounts ranging from about 0.5–15 wt. % of the resulting blend.

20. The process of claim 17 wherein the paraffinic base stock fluxing component comprises solvent refined neutral oil.

* * * * *